March 7, 1967    R. A. CAMERON    3,307,217
EXTRUDER VALVE
Filed March 12, 1964    2 Sheets-Sheet 1
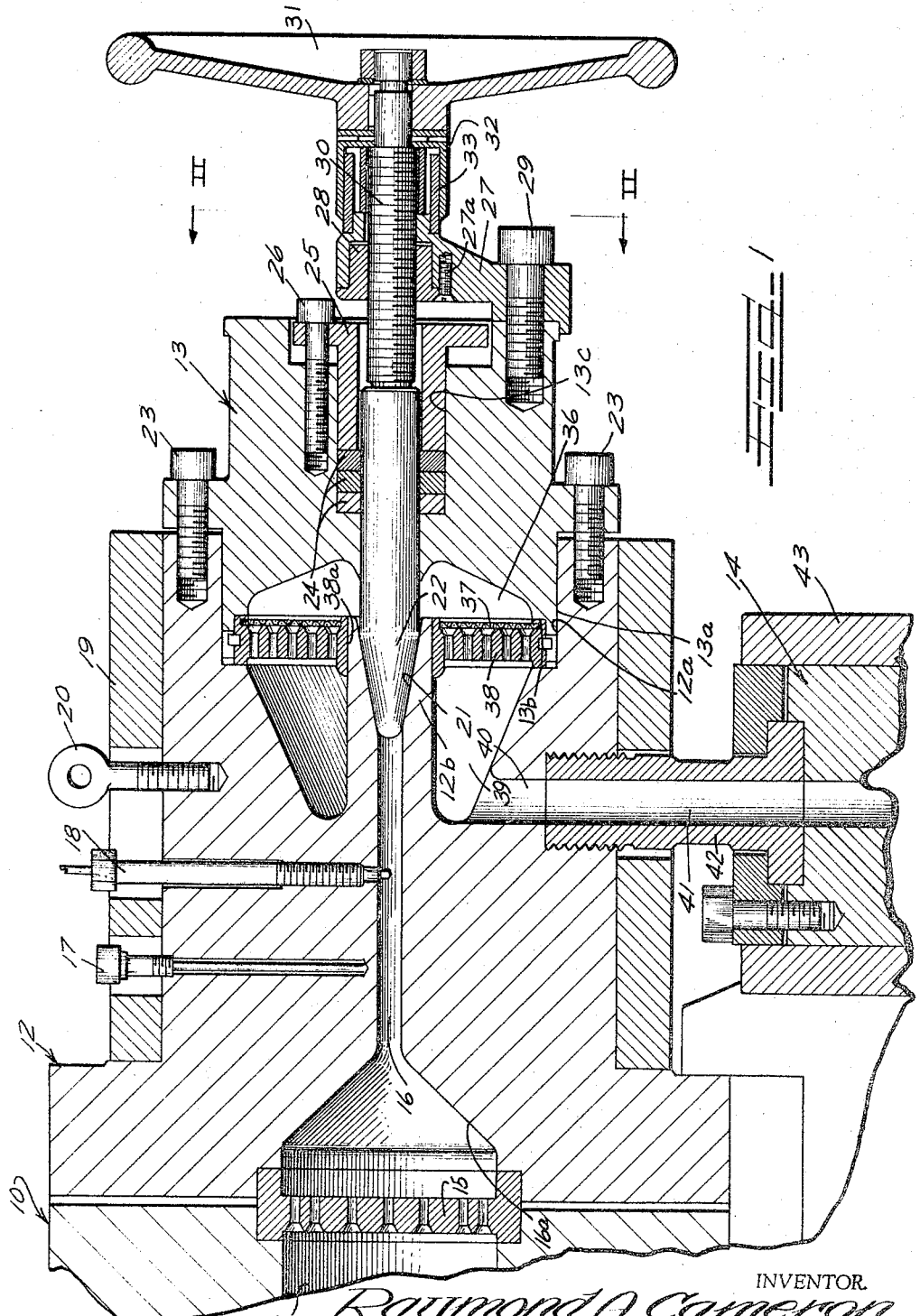
INVENTOR.
Raymond A Cameron
BY
ATTORNEYS

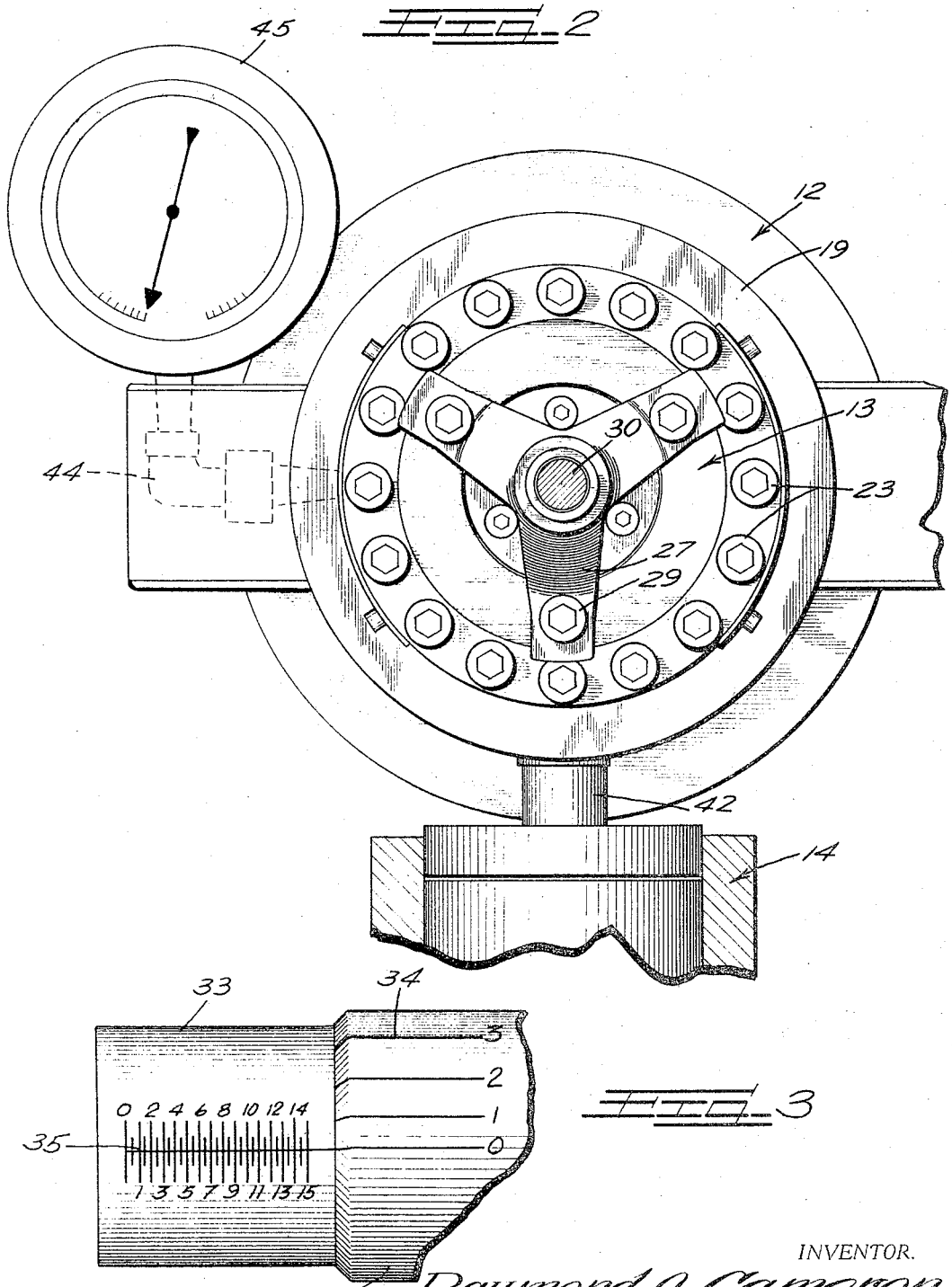

United States Patent Office

3,307,217
Patented Mar. 7, 1967

3,307,217
EXTRUDER VALVE
Raymond A. Cameron, Palatine, Ill., assignor to Beloit Corporation, Beloit, Wis., a corporation of Wisconsin
Filed Mar. 12, 1964, Ser. No. 351,368
7 Claims. (Cl. 18—12)

The present invention relates to improvements in plastic extruders and more particularly to an external type valve and screen pack, and die adapter arrangement for an extruder.

In a plastic extruder of a type conventionally used the plastic material or melt is delivered along an extruder barrel by an extruder screw and is delivered at a controlled melt temperature through a screen pack and breaker plate to a die. An external pressure valve may be provided at the delivery end of the barrel for controlling the back pressure in the barrel. For effective and satisfactory operation it is imperative that the plastic melt move uniformly through the passage at the delivery end of the barrel, and through the die and screen pack to the die, without hang up of the melt and degradation thereof. It becomes necessary to have access to the screen pack such as for removal thereof at shut down, or to replace the screen pack. In many installations heretofore available it was essential to disassemble the whole delivery unit of the extruder to gain access to the screen pack, including removal of the die adapter. In a construction heretofore available using a cylindrical basket screen pack access to the pack was available without complete disassembly but the cylindrical screen pack offers certain disadvantages over a flat screen pack. In one area of operation the flat screen pack has less tendency for hang up or hold back and degradation.

It is accordingly an object of the present invention to provide an improved plastic melt delivery arrangement for an extruder where an access to the screen pack is easily obtainable without requiring disconnection of the die or die adapter.

A further object of the invention is to provide an improved plastic melt delivery arrangement for an extruder using a flat screen pack and breaker plate and yet obtaining ease of accessibility to the screen pack and breaker plate for changing these elements.

Still another object of the invention is to provide an improved structure for delivering plastic melt from the barrel of an extruder to the die adapter which reduces the chances of hang up or hold back and degradation.

A feature of the invention is the provision of a plastic melt delivery structure for carrying the melt from the extruder barrel to the die adapter having a first valve housing with an axial passage and a valve seat at the end of the passage, a second stem housing detachably mounted on the first housing with an annular chamber and an axially adjustable valve stem for coacting with the valve seat, an annular breaker plate and screen pack clamped between the housings, an annular reverse flow chamber in the first housing receiving plastic from the breaker plate and screen pack and a lateral passage leading from the annular chamber of the first housing to a die adapter.

Other objects, advantages and features will become more apparent with the teaching of the principles of the present invention in connection with the disclosure of the preferred embodiment thereof in the specification, claims and drawings, in which:

FIGURE 1 is a sectional view taken through the axis of a structure constructed and operating in accordance with the principles of the present invention for controlling the flow of plastic melt from an extruder barrel to a die;

FIGURE 2 is a vertical sectional view taken substantially along line II—II of FIGURE 1; and FIGURE 3 is a fragmentary detailed elevational view of a portion of FIGURE 1.

As shown on the drawings:

FIGURE 1 shows an extruder barrel housing 10 with an extruder barrel chamber 11 therein from which plastic melt is delivered. The barrel chamber contains a screw and is of conventional design so that it need not be described in detail. The melt passes through a breaker plate 15 which breaks up rotation of the melt. The plate 15 however may be omitted from the structure and is not essential to operation.

The plastic melt then flows through passages in a first valve housing 12, a second valve stem housing 13 and to a die adapter 14. From the breaker plate 15 the melt flows into an axial first passage 16 from a tapered lead-in passage portion 16a. The temperature of the melt is maintained uniform in the passage 16 and the valve housing 12 is heated by an annular heater 19. The temperature of the valve housing 12 is obtained by a control thermocouple 17 which projects radially into the housing 12 and is arranged to control the heater 19.

A melt thermocouple projects through a radial opening in the housing 12 into the melt stream in the passage 16. The temperature of the melt in the passage 16 after it has been discharged from the screw is important and to a large extent governs the behavior of the extrudate in the die and the take off system.

The housing 12 is also provided with an eye bolt 20 for mechanical handling.

At the end of the passage 16 is a valve seat 21 with a coacting valve stem 22. The stem reciprocates axially to an adjusted position to increase or decrease pressure in the barrel chamber 11. Accurate setting of the valve stem 22 provides good pressure control and also controls the flow of melt through the passage 16.

The needle or stem of the valve 22 is supported in the stem housing 13 which has a cylindrical projection 13a extending into a circular recess 12a in the valve housing 12. The stem housing 13 is held in place on the housing 12 by bolts 23 extending through holes in a flange on the housing 13 and threaded into tapped holes in the housing 12, FIGURES 1 and 2.

The valve stem slides through annular packing seals 24 which are located in a well 13c on the stem housing 13 and are clamped in place by a packing collar 25 pressed against the packing rings 24 by bolts 26 threaded into tapped holes in the housing 13.

For axially adjusting the valve stem 22 a threaded shaft 30 engages the outer end of the valve stem and is supported on a spider 27 which is mounted on the stem housing 13 by bolts 29 extending through openings in the spider 27 and threaded into tapped holes in the housing 13. The spider carries an internally threaded nut 28 which is mounted in a recess on the spider and held against rotation by a threaded pin 27a. The threaded adjusting shaft has a hand wheel 31 at its outer end for adjustment, and motorized automatic controlled rotation of the shaft may be provided, as will be appreciated.

The threaded adjustment shaft 30 is provided with a vernier indicator as shown in FIGURE 3. The vernier indicator has an external sleeve 32 which rotates with the hand wheel 31, and an internal sleeve 33 which is stationarily mounted on the spider 27. The outer sleeve has axial index marks 34 and the inner sleeve circumferential index marks 35 which provide a vernier reading of the position of the valve stem 22 in the manner which is well known.

As the plastic melt passes the valve stem 22, it enters an annular first chamber 36 in the stem housing 13 which surrounds the valve stem. This chamber leads to a screen pack 37 and a breaker plate 38. The screen pack and breaker plate are clamped at the base of the recess 12a in the housing 12 and held therein by a shoulder 13b on the housing 13. The melt flows through the screen pack 37 and breaker plate 38 into a second annular chamber 39 in the first housing 12.

The second chamber 39 is coaxial with the passage 16 and extends in an opposite direction, with the melt having reversed its direction of flow to flow through the screen pack 37 and breaker plate 38. The second chamber 39 is tapered and diminishes in cross-section so as to prevent hang up and degradation of the plastic. The first chamber 36 also diminishes in thickness radially outwardly and the chambers 36 and 39 provide for streamlined flow substantially eliminating the possibility of hold up and consequent plastic degradation.

From the second chamber 39 the melt flows radially outwardly through a passage 40 into a passage 41 in a tubular adapter 42 which is threaded radially into the side of the housing 12. The adapter 42 leads to the die adapter 14 which has a surrounding heater 43.

As shown in FIGURE 2, a pressure measuring line 44 is tapped into the side of the housing 12 and communicates with the second chamber 39. A pressure gauge 45 is connected to the pressure line 44. The pressure line measures pressure following the breaker plate and screen pack although gauges may be installed both before and after the plate and screens. The pressure of the flow is helpful in carrying out extruder performance calculations and a sudden pressure drop will indicate that the screen and plate assembly become plugged.

For easy and rapid removal of the screen pack 37 and breaker plate 38 it is merely necessary to remove the bolts 23 to remove the stem housing 13 which exposes the plate and screens. The housing 12 has a boss portion formed around the valve seat 21 which provides a supporting seat for the annular inner surface 38a of the breaker plate and screens. The plate and screens will thus be supported on the boss portion 12b when the housing 13 is removed so that the operator can reach in and pull out the plate and screens.

This change in plate and screens can be accomplished without disturbing the relationship or disassemblying any of the other parts and can be done readily and quickly. The valve setting can remain the same without being altered during the change of plate and screens.

In operation, the plastic melt flows from the extruder barrel 11 through the first passage 16 past the valve stem 22, into the first chamber 36 and reverses its direction of flow passing through the screen pack 37 and breaker plate 38 into the second chamber 39 and laterally out through the passages 40 and 41 to the die adapter 14. For rapid change of the screen pack 37 and the breaker plate 38 without disassembling any of the other parts, the bolts 23 are removed and the housing 13 pulled out of the way for immediate and full access to the screen and plate 37 and 38.

Thus it will be seen that I have provided an improved mechanism for use with a plastic extruder which meets the objectives and advantages above set forth. The mechanism utilizes an advantageous plate type screen pack and breaker plate, accommodates improved rapid flow of the melt in a compact space reducing the dangers of hang up and degradation and provides advantages over structures heretofore available.

The drawings and specification present a detailed disclosure of the preferred embodiments of the invention, and it is to be understood that the invention is not limited to the specific forms disclosed, but covers all modifications, changes and alternative constructions and methods falling within the scope of the principles of the invention.

I claim as my invention:

1. In a plastic extruder the combination comprising, a housing member having a passage for receiving heated plastic melt and having a valve seat,
a screen pack mounted on said member receiving melt from said passage,
a second housing member removably mounted on said first housing member and having an adjustable valve element coacting with said valve seat for controlling back pressure in said passage and flow to said screen pack,
said screen pack being removable with removal of said second housing member from said first housing member,
and a die adapter mounted on the first housing member,
said first housing member having a die passage leading from the screen pack for delivery of melt to said die adapter.

2. In a plastic extruder the combination comprising,
a first housing member having an axial passage for receiving heated plastic melt and having a valve seat,
an annular screen pack surrounding said passage at the end thereof,
a second housing member removably mounted on said first housing member and having an axially adjustable valve element coacting with said valve seat for controlling back pressure in said passage and flow to said screen pack,
said screen pack being removable with removal of the second housing member from the first housing member,
and a die adapter mounted on the first housing member,
said housing members having passage means leading from the valve to the screen pack and to the die adapter.

3. In a plastic extruder the combination comprising,
a valve housing having an axial passage for receiving plastic melt,
a heating means for heating the valve housing,
a control thermocouple in the housing for controlling the heating means,
means defining an annular valve seat at the discharge end of the passage in the valve housing,
a stem housing removably secured to the valve housing and having an annular first chamber receiving plastic melt from said passage,
an axially adjustable valve stem mounted in the stem housing coacting with the valve seat for controlling the flow of plastic,
an annular screen pack clamped between said housings receiving melt from the chamber in the stem housing,
an annular chamber in the valve housing downstream of the screen pack tapering to have a diminishing cross-section to prevent hang up,
a lateral delivery passage leading from the chamber in the valve housing,
and a die adapter having a passage receiving melt from the lateral passage of the valve housing.

4. In a plastic extruder the combination comprising, a first housing member defining a flow passage for receiving heated plastic melt, a second housing member removably mounted on the first member and defining a flow chamber for receiving the melt from the first housing member, said flow passage having a first portion extending in a first direction and a second portion extending in a reverse direction surrounding said first portion and directing the flow of the melt to a die, said flow chamber being superimposed and substantially contiguous with said second portion of the flow passage, a screen pack positioned between the first and second housing means, said screen pack being removable with the separation of the first and second housing means and a valve means positioned between the flow passage and the flow chamber of said housing members controlling flow through said housing members.

5. In a plastic extruder the combination comprising, a first housing member defining a flow passage for receiving heated plastic melt, a second housing member removably mounted on the first member and defining a flow chamber for receiving the melt from the first housing member, said flow passage having a first portion extending in a first direction and a second portion extending in a reverse direction surrounding said first portion and directing the flow of the melt to a die, said second portion including an annular chamber surrounding said first portion, said flow chamber being superimposed and substantially contiguous with said second portion of the flow passage, a screen pack positioned between the first and second housing means, said screen pack being removable with the separation of the first and second housing means and a valve means positioned between the flow passage and the flow chamber of said housing members controlling flow through said housing members.

6. In a plastic extruder the combination comprising, a first housing member defining a flow passage for receiving heated plastic melt, a second housing member removably mounted on the first member and defining a flow chamber for receiving the melt from the first housing member, said flow passage having a first portion extending in a first direction and a second portion extending in a reverse direction surrounding said first portion and directing the flow of the melt to a die, said second portion including an annular chamber surrounding said first portion, said second portion diminishing in cross-sectional size following the screen pack, said flow chamber being superimposed and substantially contiguous with said second portion of the flow passage, a screen pack positioned between the first and second housing means, said screen pack being removable with the separation of the first and second housing means and a valve means positioned between the flow passage and the flow chamber of said housing members controlling flow through said housing members.

7. In a plastic extruder the combination comprising a first housing member having a passage for receiving heated plastic melt, a second member removably mounted on the first member and having a passage for reversing the flow of the melt from the first housing member, said first housing member having an annular passage communicating with the passage of the second housing member for directing the flow of melt to a die, a screen pack mounted between said housing members and receiving the melt from the passage of the second housing member, said screen pack being removable with the separation of the first and second housing members, a valve means positioned between the respective passageways of the first and second housing means for controlling the flow of melt through said passages, and a die adapter mounted on the first housing member receiving melt from said annular passage.

References Cited by the Examiner

UNITED STATES PATENTS

| | | | |
|---|---|---|---|
| 2,291,212 | 7/1942 | Clinefelter | 18—120 |
| 2,405,039 | 7/1946 | Jesionowsksi | 18—12 |
| 2,719,326 | 10/1955 | Dykehouse | 18—30 |
| 2,725,596 | 12/1955 | Weber | 18—12 X |
| 2,814,851 | 12/1957 | Hervey | 18—12 X |
| 2,961,706 | 11/1960 | Swenson | 18—30 |
| 2,977,634 | 4/1961 | Morse | 18—30 |
| 3,018,516 | 1/1962 | Clinefelter | 18—14 |
| 3,023,458 | 3/1962 | Seymour | 18—30 X |
| 3,050,084 | 8/1962 | Palfey | 18—12 X |
| 3,054,143 | 9/1962 | Stenger. | |
| 3,059,276 | 10/1962 | Yokana | 18—12 |
| 3,106,746 | 10/1963 | Sunday | 18—12 |
| 3,135,994 | 9/1964 | Skinner | 18—12 |
| 3,146,494 | 9/1964 | Sponaugle | 18—12 |

WILLIAM J. STEPHENSON, *Primary Examiner.*